United States Patent
Shimode et al.

(10) Patent No.: US 9,984,806 B2
(45) Date of Patent: May 29, 2018

(54) COIL MOUNTING STRUCTURE

(71) Applicant: CENTRAL JAPAN RAILWAY COMPANY, Aichi (JP)

(72) Inventors: Daisuke Shimode, Narashino (JP); Toshiaki Murai, Hachioji (JP); Yoshiyasu Hagiwara, Yamato (JP); Masayuki Tobikawa, Yokohama (JP); Yukio Takahashi, Toyohashi (JP)

(73) Assignee: CENTRAL JAPAN RAILWAY COMPANY, Aichi (JP)

( * ) Notice: Subject to any disclaimer, the term of this patent is extended or adjusted under 35 U.S.C. 154(b) by 0 days. days.

(21) Appl. No.: 14/645,244

(22) Filed: Mar. 11, 2015

(65) Prior Publication Data

US 2015/0279543 A1 Oct. 1, 2015

(30) Foreign Application Priority Data

Mar. 11, 2014 (JP) .................................. 2014-047566

(51) Int. Cl.

| | |
|---|---|
| *H01F 27/06* | (2006.01) |
| *H02J 7/00* | (2006.01) |
| *H01F 27/42* | (2006.01) |
| *B60L 9/00* | (2006.01) |
| *B60L 5/00* | (2006.01) |
| *B60L 11/18* | (2006.01) |

(52) U.S. Cl.
CPC .............. *H01F 27/06* (2013.01); *B60L 5/005* (2013.01); *B60L 9/00* (2013.01); *B60L 11/182* (2013.01)

(58) Field of Classification Search
CPC ............. H01F 27/06; B60L 9/00; B60L 5/005

USPC ....... 336/65–68; 320/108; 307/104; 104/286
See application file for complete search history.

(56) References Cited

U.S. PATENT DOCUMENTS

| | | | |
|---|---|---|---|
| 2010/0065352 A1 | 3/2010 | Ichikawa | |
| 2010/0072815 A1* | 3/2010 | Hahn | ....................... B60L 5/005 307/17 |
| 2011/0259694 A1 | 10/2011 | Matsumura | |

(Continued)

FOREIGN PATENT DOCUMENTS

| | | |
|---|---|---|
| JP | 4911262 B2 | 4/2012 |
| JP | 5077421 B2 | 11/2012 |

(Continued)

OTHER PUBLICATIONS

Notice of Reasons for Rejection for Japanese Application No. 20174-047566: dated Mar. 20, 2018.

*Primary Examiner* — Mangtin Lian
(74) *Attorney, Agent, or Firm* — Koppel, Patrick, Heybl & Philpott

(57) ABSTRACT

Provided is a coil mounting structure for a device that comprises a primary coil to be supplied with an alternating current, and a secondary coil arranged facing the primary coil and configured to supply an electric power to a load provided in a housing by using an induced voltage generated by an electromagnetic field produced by the primary coil. The coil mounting structure comprises at least one mounting part provided in a region of the housing, the region facing the primary coil, and the at least one mounting part is configured to hold the secondary coil to the housing. The at least one mounting part comprises at least one gap area configured to interrupt a circuit generated by the at least one mounting part.

1 Claim, 7 Drawing Sheets

(56) References Cited

U.S. PATENT DOCUMENTS

| | | | |
|---|---|---|---|
| 2013/0249303 A1* | 9/2013 | Keeling ................ | H01F 27/022 307/104 |
| 2014/0240076 A1* | 8/2014 | Elias .................... | B60L 11/182 336/221 |

FOREIGN PATENT DOCUMENTS

| | | |
|---|---|---|
| JP | 2012254778 A | 12/2012 |
| JP | 2012254781 A | 12/2012 |
| JP | 2012254782 A | 12/2012 |
| WO | WO 2012/132205 | 10/2012 |
| WO | WO 2013/142066 | 9/2013 |

* cited by examiner

COIL MOUNTING STRUCTURE

CROSS-REFERENCE TO RELATED APPLICATIONS

This application claims the benefit of Japanese Patent Application No. 2014-047566 filed Mar. 11, 2014 in the Japan Patent Office, the entire disclosure of which is incorporated herein by reference.

BACKGROUND

The present invention relates to a coil mounting structure.

As a method for supplying electric power to a moving object, various power supply methods without use of a power supply code and/or a power transmission cable have been proposed. Also, many structures for such power supply methods have been proposed.

For example, Japanese patent No. 4911262 (Patent Document 1) has proposed the following structure: in an electrically-powered vehicle capable of running with electric power supplied from a power source that is located outside of the vehicle, a power reception resonator (corresponding to a secondary coil in the present application) is disposed under a metallic underbody.

Also, Japanese patent No. 5077421 (Patent Document 2) has proposed a structure that includes an electromagnetic shield member containing resonators thereinside, and the electromagnetic shield member has an opening in a direction toward the power transmitting resonator or an opening in a direction toward the power receiving resonator, so as to allow transmission of electricity from the power transmitting resonator to the power receiving resonator. Patent Document 2 describes that with this structure, electromagnetic field leakage can be appropriately inhibited.

Unexamined Japanese patent application publication No. 2012-254778 (Patent Document 3), Unexamined Japanese patent application publication No. 2012-254781 (Patent Document 4), Unexamined Japanese patent application publication No. 2012-254782 (Patent Document 5) have proposed a structure in which a mounting structure is composed of aluminum, etc., and a structure in which a protection member is provided so as to inhibit magnetic field leakage. Also in Patent Documents 3 to 5, a structure has been proposed in which a link mechanism capable of extending and contracting in a vertical direction is provided to enable protection of coils, etc. at a time of collision. Moreover, it has been proposed to adopt a configuration in which the mounting structure is inclined in a front-rear direction, thereby achieving improved efficiency in supply of electric power.

SUMMARY

In the technique described in Patent Document 1, the secondary coil is disposed under the metallic underbody, thereby inhibiting influence of an electromagnetic wave on equipments installed inside the vehicle. Patent Document 1, however, does not describe a mounting structure for mounting the secondary coil on the underside of the underbody. In addition, depending on mounting methods, a magnetic field generated by the primary coil may be shielded, which induces eddy current and/or induced current in the mounting structure itself, resulting in increased loss of electric power.

As a method for reducing magnetic field leakage in a conventional primary coil or a conventional secondary coil, Patent Document 2 has proposed a technique of accommodating the coils inside the electromagnetic shield member. However, the technique described in Patent Document 2 also shields the magnetic field generated by the primary coil, and therefore, a voltage induced by the secondary coil may be reduced, reducing efficiency of electric power supply.

The techniques described in Patent Documents 3 to 5 relate to a mounting structure that is adapted to protect coils, etc., at a time of collision; thus, it would be difficult to achieve reduction of the loss caused by induced current or eddy current.

In view of the above, it is preferable to provide a coil mounting structure that can inhibit generation of the induced current, etc., thereby achieving improved efficiency in power supply.

A coil mounting structure in one aspect of the present invention is a coil mounting structure for a device that comprises a primary coil to be supplied with an alternating current, and a secondary coil arranged facing the primary coil and configured to supply an electric power to a load provided in a housing by using an induced voltage generated by an electromagnetic field produced by the primary coil; the coil mounting structure comprises at least one mounting part provided in a region of the housing, the region facing the primary coil, and the at least one mounting part configured to hold the secondary coil to the housing. The at least one mounting part comprises at least one gap area configured to interrupt a circuit generated by the at least one mounting part.

According to the coil mounting structure in one aspect of the present invention, because of the existence of the at least one gap, a closed circuit is less likely to be formed in the at least one mounting part. Therefore, it is possible to inhibit generation of induced current and/or eddy current in the at least one mounting part. Specifically, generation of the induced current, etc. by the electromagnetic field generated by the secondary coil can be inhibited. Consequently, heat generation in the at least one mounting part caused by the induced current, etc. can be reduced. In addition, since generation of the induced current, etc. is inhibited in the at least one mounting part, decrease of an induced voltage that is generated in the secondary coil can be also inhibited.

In one aspect of the present invention, it is preferable that an insulating part containing an insulating material is provided in the at least one gap area.

Since the insulating part is provided in the at least one gap area, it is possible to further inhibit generation of the induced current, etc. In addition, a dimension of the gap area is narrowed (i.e., a thickness of the insulating part is reduced), thereby facilitating size reduction of the mounting part, while inhibiting generation of the induced current, etc. As a material forming the insulating part, a material having an insulating property higher than that of air can be used.

In one aspect of the present invention, it is preferable that the at least one mounting part has a stick-like elongated shape and the at least one mounting part comprises a plurality of mounting parts. The plurality of mounting parts are arranged side-by-side and spaced apart from one another so as to form the at least one gap area.

By providing the at least one gap area and also arranging the plurality of stick-shaped mounting parts side-by-side, a closed circuit is less likely to be formed in the plurality of mounting parts; this can inhibit generation of induced current and/or eddy current in the plurality of mounting parts. Specifically, generation of the induced current, etc. by the electromagnetic field generated by the secondary coil can be inhibited and therefore, heat generation of the plurality of mounting parts caused by the induced current, etc. can be reduced. Moreover, it is possible to inhibit decrease of an induced voltage that is generated in the secondary coil. Furthermore, since the plurality of mounting parts are arranged spaced apart from one another to form the at least one gap area, a number of components constituting the plurality of mounting parts can be reduced, compared with a case where the insulating part is provided in the at least one gap area.

In one aspect of the present invention, at least one of the plurality of mounting parts preferably contains a non-metallic material having an electrical conductivity lower than an electrical conductivity of a metallic material.

The at least one of the plurality of mounting parts that contains the non-metallic material is preferably arranged at least at one end of both ends of an arrangement of the plurality of mounting parts.

Since the at least one of the mounting parts contains the non-metallic material, generation of induced current and/or eddy current can be inhibited in the at least one of the mounting parts. Specifically, generation of the induced current, etc. generated by the electromagnetic field produced by the primary coil can be inhibited. This makes it possible to inhibit decrease of an induced voltage that is generated in the secondary coil.

In one aspect of the present invention, it is preferable that at least one of the plurality of mounting parts comprises a clearance configured to separate the stick-like elongated shape.

In one aspect of the present invention, the at least one of the plurality of mounting parts that is provided with the clearance is arranged at least at one end of both ends of the arrangement of the plurality of mounting parts.

Since the clearance is provided in the at least one of the plurality of mounting parts, weight of the at least one of the plurality of mounting parts can be reduced. Moreover, in a case where the at least one of the mounting parts contains a metallic material, generation of induced current and/or eddy current in the at least one of the plurality of mounting parts can be inhibited. Consequently, decrease of an induced voltage that is generated in the secondary coil can be inhibited.

In one aspect of the present invention, the housing is preferably a moving object, and the plurality of mounting parts are preferably arranged to extend in a traveling direction of the moving object. If the housing is the moving object, in many cases, the secondary coil has an elongated shape in the traveling direction. That is to say, in many cases, the secondary coil has a longer length thereof in the traveling direction than a length thereof in a direction perpendicular to the traveling direction. In this case, if the plurality of mounting parts are arranged to extend in the traveling direction, rigidity of the secondary coil can be reinforced, compared with a case where the plurality of mounting parts are arranged to extend in other directions than the traveling direction.

In one aspect of the present invention, it is preferable that the housing is a moving object, and that the plurality of mounting parts are preferably arranged to extend in a guiding direction that intersects with the traveling direction of the moving object. If the housing is the moving object, in many cases, the primary coil has an elongated shape in the traveling direction. Specifically, in order to facilitate power supply even during movement of the housing, the primary coil having the elongated shape in the traveling direction may be used. In this case, if the plurality of mounting parts are arranged to extend in the guiding direction, the following phenomenon can be inhibited: an induced voltage is reduced because of eddy current generated inside the plurality of mounting parts.

In one aspect of the present invention, it is preferable that the coil mounting structure further comprises a protection cover that is configured to surround a circumference of the secondary coil and that opens towards the primary coil; it is preferable that the protection cover contains a non-metallic material having an electrical conductivity lower than an electrical conductivity of a metallic material.

The protection cover is configured with the non-metallic material and thus, generation of induced current and/or eddy current can be inhibited in the at least one mounting part arranged inside the protection cover. Specifically, generation of the induced current, etc. generated by the electromagnetic field produced by the primary coil can be inhibited. Consequently, it is possible to inhibit decrease of an induced voltage that is generated in the secondary coil.

Effect of the Invention

According to the coil mounting structure in one aspect of the present invention, by providing the at least one gap, a closed circuit is less likely to be formed in the at least one mounting part. Therefore, generation of induced current, etc. can be inhibited, thereby achieving improved efficiency in electric power supply.

BRIEF DESCRIPTION OF THE DRAWINGS

The present invention will now be described by way of example with reference to the accompanying drawings, in which.

DETAILED DESCRIPTION OF THE PREFERRED EMBODIMENTS

First Embodiment

Hereinafter, the first embodiment of the present invention will be described with reference to FIGS. 1 and 2. In the first embodiment, a power feed device 1 is configured to supply electric power in a non-contact manner to a moving object 5.

An example of the moving object 5 includes a transporting body to be used for transporting passengers and/or cargo. An object to which the coil mounting structure, which is one example of the present invention, can be applied is not limited to the power feed device 1 that supplies electric power to the moving object 5. A device that supplies electric power to a different equipment to be driven by electric power at a specified position can be also included in the object to which the coil mounting structure can be applied.

Figure 1:
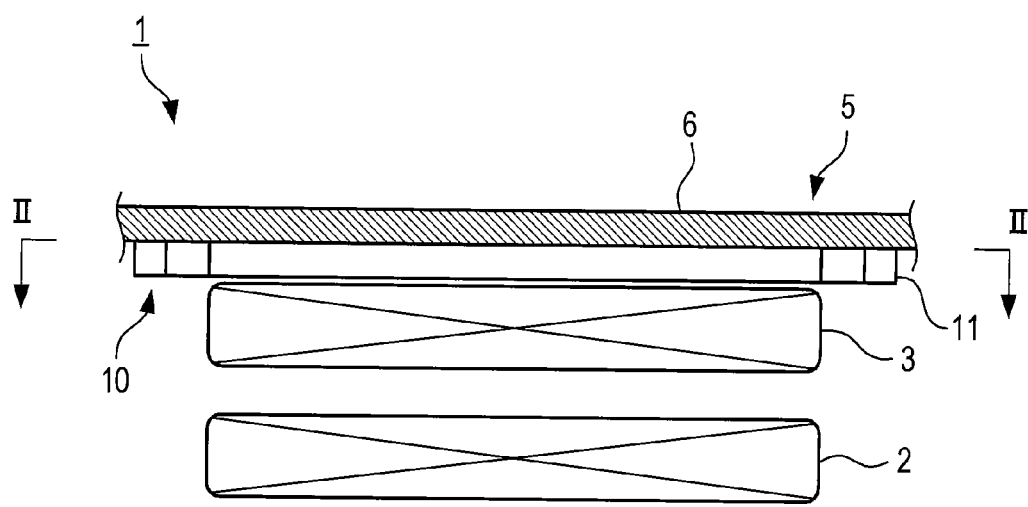
FIG. 1 is a diagram illustrating a coil mounting structure according to a first embodiment of the present invention.

As shown in FIG. 1, the power feed device 1 comprises a primary coil 2, a secondary coil 3, and an mounting part 10. To the primary coil 2, an alternating current is supplied. The secondary coil 3 supplies electric power to a load device (not shown), such as a motor, which is provided in the moving object 5. The mounting part 10 is used to mount the secondary coil 3 to a housing 6 of the moving object 5.

Unlike the secondary coil 3 provided in the moving object 5, the primary coil 2 is arranged and fixed to a region corresponding to a region where the moving object 5 moves. The primary coil 2 is supplied with an alternating current from an external power supply facility. In the first embodiment, the primary coil 2 is supplied with a high-frequency alternating current (i.e., current whose direction varies sinusoidally with time). Around the primary coil 2, an electromagnetic field corresponding to the supplied alternating current is generated.

As shown in FIG. 1, the primary coil 2 may have the same size and shape as those of the secondary coil 3. Alternatively, the primary coil 2 may have a size and shape different from those of the secondary coil 3. For example, the primary coil 2 may have an elongated shape extending in a traveling direction of the moving object 5.

The secondary coil 3 is arranged facing the primary coil 2; the secondary coil 3 supplies electric power to the load device by using an induced voltage that is generated by the electromagnetic field produced by the primary coil 2.

Figure 2:
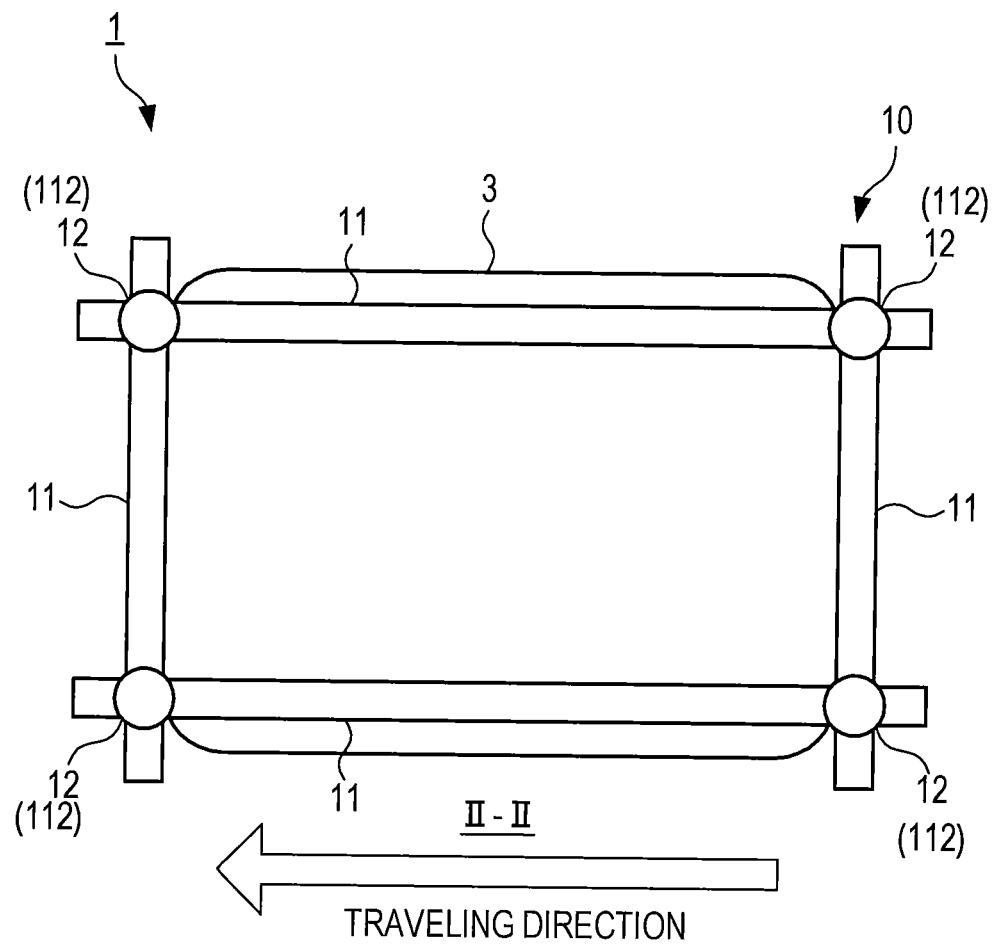
FIG. 2 is a cross sectional view showing the coil mounting structure, taken along the line 1141.

In the first embodiment, as shown in FIG. 2, the secondary coil 3 has a rectangular shape, a longer side of which is located in the traveling direction of the moving object 5 when viewed from the moving object 5. However, the shape of the secondary coil 3 should not be limited to the above shape, and the secondary coil 3 may have a shape other than the rectangular shape, such as a circular shape. Any known form can be used as forms of the primary coil 2 and the secondary coil 3, and there is no limitation of forms of the primary coil 2 and the secondary coil 3.

The mounting part 10 is a member configured to hold the secondary coil 3, and is to be attached to the housing 6 of the moving object 5. The mounting part 10 comprises four stick-shaped rod parts (attaching parts) 11, and insulating parts 12.

The rod parts 11 are members made of metal, and are to be mounted to the housing 6 of the moving object 5 by way of a fastening means, such as bolts. A region of the housing 6, to which the rod parts 11 are to be mounted, faces the primary coil 2.

The four rod parts 11 comprise a first pair of the rod parts 11 and a second pair of the rod parts 11. The first pair of the rod parts 11 extend in the traveling direction of the moving object 5 and are located respectively in vicinities of a left end and a right end of the secondary coil 3. The second pair of the rod parts 11 extend in a guiding direction perpendicular to the traveling direction and are located respectively in vicinities of a front end and a rear end of the secondary coil 3.

The insulating part 12 is a member containing an insulating material. The insulating part 12 is arranged at a position where the rod parts 11 are crossed to each other. In other words, the insulating part 12 is arranged to fill a gap formed at the position where the rod parts 11 are crossed to each other.

As the insulating material, a material having a higher insulation property than, at least, that of air can be used; examples of such a material include an elastic material, such as rubber, a resin material, and so on.

This arrangement of the insulating parts 12 makes the four rod parts 11 to be electrically separated from one another. With this configuration, if induced current and/or eddy current is generated in one of the rod parts 11 due to variation of the electromagnetic field, these induced current, etc. is inhibited from flowing into the adjacent rod parts 11. In other words, a closed circuit comprising the rod parts 11 is less likely to be formed.

Examples of the electromagnetic field that generates the induced current, etc. in the rod parts 11 include an electromagnetic field generated by electric current flowing in the secondary coil 3, and an electromagnetic field generated by electric current flowing in the primary coil 2.

Because of the existence of the insulating part 12 at the position where the rod parts 11 are crossed to each other, a closed circuit comprising the rod parts 11 is less likely to be formed, and therefore, generation of induced current and/or eddy current in the mounting part 10 can be inhibited. Especially, the induced current, etc. that is generated by the electromagnetic field produced by the secondary coil 3 can be inhibited. As a result, heat generation of the mounting part 10 due to the induced current, etc. can be inhibited.

Moreover, eddy current in the mounting part 10, which is generated by the primary coil 2, is inhibited, and therefore, decrease of the induced voltage generated in the secondary coil 3 can be inhibited. Thus, a power-supply efficiency can be improved.

In particular, compared with a case in which a space is simply formed (a gap is formed) at the position where the rod parts 11 are crossed each other, generation of induced current, etc. can be further inhibited by arranging an insulating part containing a material having a higher insulation property than that of air at the position where the rod parts 11 are crossed to each other. Moreover, in this case, it is possible to narrow a dimension of the gap, while inhibiting generation of the induced current, etc., which can facilitate size reduction of the mounting part 10.

Second Embodiment

Next, the second embodiment of the present invention will be described with reference to FIG. 3. Although a basic configuration of a coil mounting structure in the second embodiment is the same as that of the coil mounting structure in the first embodiment, the coil mounting structure in the second embodiment has a different arrangement of the rod parts from that in the first embodiment. Accordingly, in the second embodiment, the arrangement of the rod parts will be described with reference to FIG. 3, and explanations of the other constituent elements, etc. will not be repeated.

Figure 3:
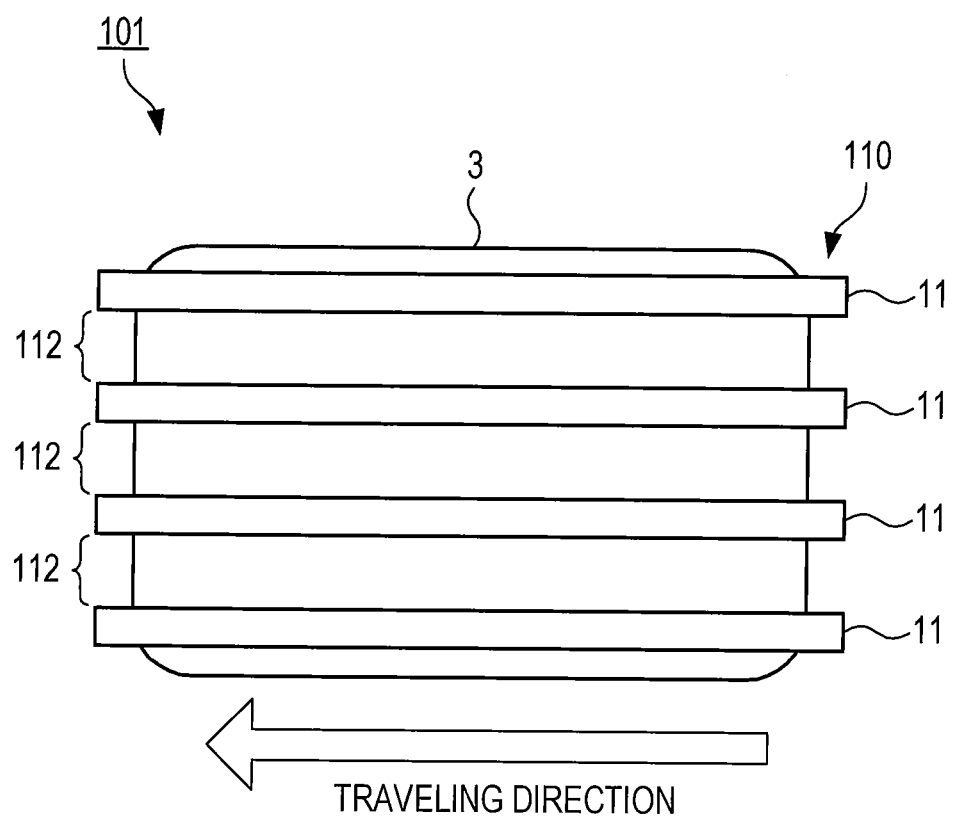
FIG. 3 is a diagram showing a coil mounting structure according to a second embodiment of the present invention.

As shown in FIG. 3, a mounting part 110 of a power feed device 101 according to the second embodiment comprises four stick-shaped rod parts 11. The rod parts 11 are arranged to extend in the traveling direction of the moving object 5 (left-right direction in FIG. 3) and arranged side-by-side and spaced apart from one another so as to form a gap 112 between the rod parts 11. The number of the rod parts 11 should not be limited to four and may be less than or more than four.

The arrangement state of the rod parts 11 in which the rod parts 11 extend in the traveling direction may include a range of arrangement from an arrangement state in which a center line of the rod part 11 is parallel to the traveling direction to an arrangement state in which the center line of the rod part 11 forms an angle of 45° with respect to the traveling direction. As long as the four rod parts 11 are arranged without contacting one another within the aforementioned range of arrangement, all of the rod parts 11 may not be arranged in parallel to the traveling direction. Also, there is no limitation to a distance between the rod parts 11. The rod parts 11 may be arranged with an equal distance or an unequal distance therebetween.

By arranging the four rod parts 11 side-by-side so as to provide the gaps 112 among the four rod parts 11, a closed circuit comprising the rod parts 11 is less likely to be formed. Consequently, generation of induced current and/or eddy current in the mounting part 110 can be inhibited. It is, therefore, possible to inhibit heat generation of the mounting part 110 caused by the induced current, etc. and also inhibit decrease of an induced voltage that is generated in the secondary coil 3. Moreover, a number of components constituting the mounting part 110 can be reduced, compared with a case where the insulating parts 12 are provided among the rod parts 11.

Third Embodiment

Next, the third embodiment of the present invention will be described with reference to FIG. 4. Although a basic configuration of a coil mounting structure in the third embodiment is the same as that of the coil mounting structure in the second embodiment, the coil mounting structure in the third embodiment has a different arrangement of the rod parts from that in the second embodiment. Accordingly, in the third embodiment, the arrangement of the rod parts will be described with reference to FIG. 4 and explanations of the other constituent elements, etc. will not be repeated.

Figure 4:
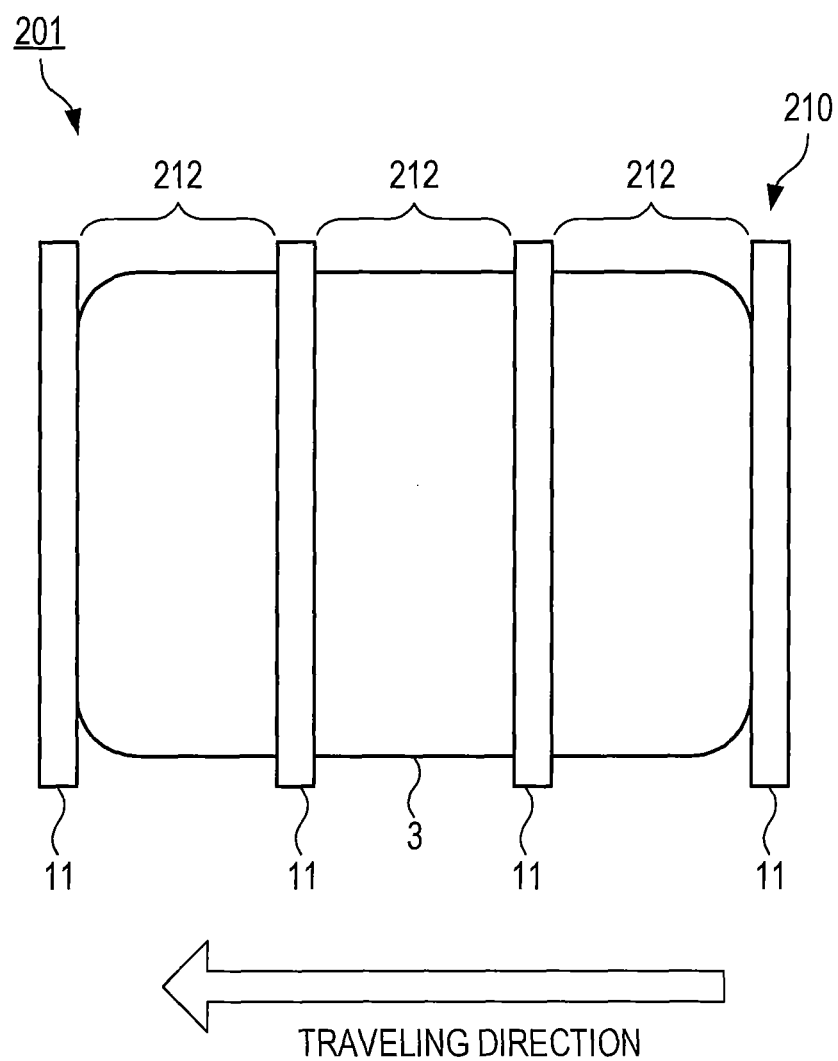
FIG. 4 is a diagram showing a coil mounting structure according to a third embodiment of the present invention.

As shown in FIG. 4, a mounting part 210 of a power feed device 201 according to the third embodiment comprises four stick-shaped rod parts 11. The rod parts 11 are arranged to extend in the guiding direction of the moving object 5 (up-down direction in FIG. 4) and arranged side-by-side and spaced apart from one another so as to form a gap 212 between the rod parts 11. Here, the guiding direction is a direction perpendicular to the traveling direction of the moving object 5. The number of the rod parts 11 should not be limited to four and may be less than or more than four.

The arrangement state of the rod parts 11 in which the rod parts 11 extend in the guiding direction may include a range of arrangement from an arrangement state in which a center line of the rod part 11 is parallel to the guiding direction to an arrangement state in which the center line of the rod part 11 forms an angle of 45° with respect to the guiding direction. As long as the four rod parts 11 are arranged without contacting one another within the aforementioned range of arrangement, all of the rod parts 11 may not be arranged in parallel to the guiding direction. Also, there is no limitation to a distance between the rod parts 11. The rod parts 11 may be arranged with an equal distance or an unequal distance therebetween.

As in the second embodiment, by arranging the four rod parts 11 side-by-side so as to provide the gaps 212 among the rod parts 11, generation of induced current and/or eddy current in the mounting part 210 can be inhibited. Consequently, it is possible to inhibit heat generation of the mounting part 210 caused by the induced current, etc. and also inhibit decrease of an induced voltage that is generated in the secondary coil 3. Moreover, a number of components constituting the mounting part 210 can be reduced, compared with a case where the insulating parts 12 are provided among the rod parts 11.

Fourth Embodiment

Next, the fourth embodiment of the present invention will be described with reference to FIG. 5. Although a basic configuration of a coil mounting structure in the fourth embodiment is the same as that of the coil mounting structure in the second embodiment, the coil mounting structure in the fourth embodiment is different from that in the second embodiment with respect to an arrangement of some of the rod parts. Accordingly, in the fourth embodiment, some of the rod parts will be described with reference to FIG. 5, and explanations of the other constituent elements, etc. will not be repeated.

Figure 5:
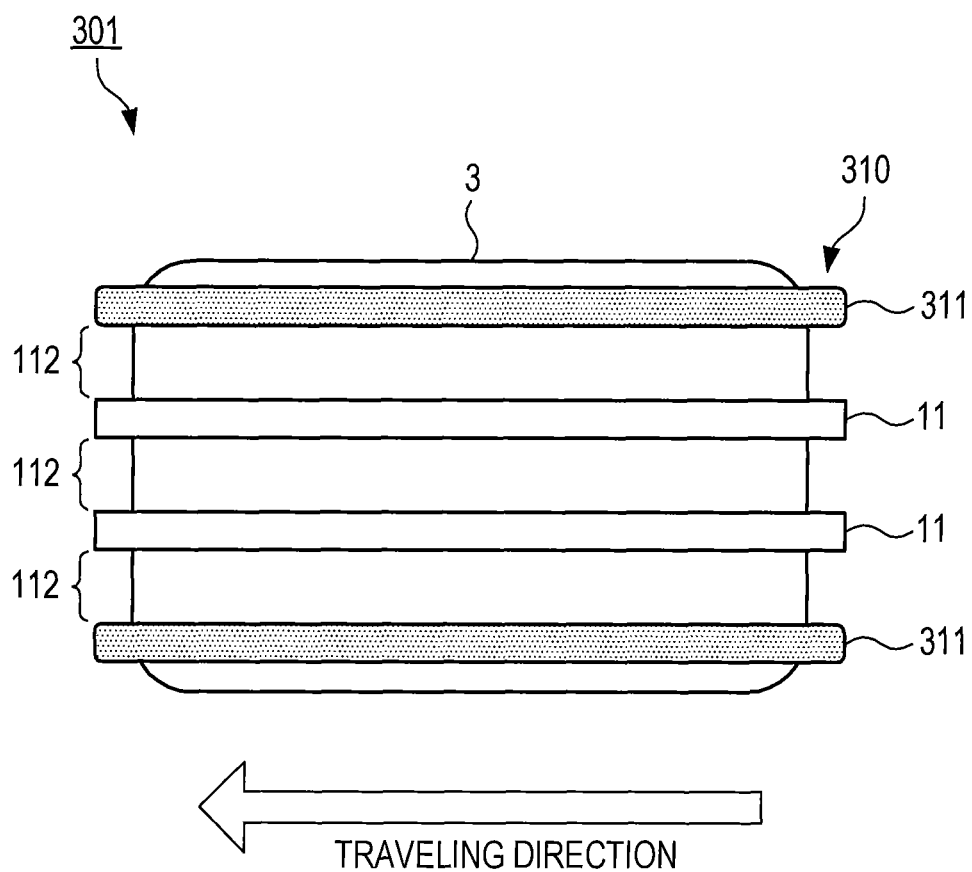
FIG. 5 is a diagram showing a coil mounting structure according to a fourth embodiment of the present invention.

As shown in FIG. 5, a mounting part 310 of a power feed device 301 in the fourth embodiment comprises two stick-shaped rod parts 11 and two stick-shaped rod parts 311. The rod parts 311 are different from the rod parts 11 as the rod parts 311 contain non-metallic material; however, other features such as shape of the rod parts 311 are the same as those of the rod parts 11. Examples of the non-metallic material include a non-metallic material having an electrical conductivity lower than that of metal, more specifically, resin material such as fiber-reinforced resin, ceramic material, and so on.

The rod parts 11 and the rod parts 311 are arranged to extend in the traveling direction of the moving object 5 (left-right direction in FIG. 5). Also, the rod parts 11 and the rod parts 311 are arranged side-by-side in the guiding direction (up-down direction in FIG. 5) of the moving object 5. Moreover, the two rod parts 311 are disposed, respectively, on both sides (outer sides) of the arrangement of the rod parts 11 and the rod parts 311. The two rod parts 11 are arranged next to each other between the two rod parts 311 arranged on the outer sides. In other words, the two rod parts 11 are arranged side-by-side and inwardly from the rod parts 311, and the rod parts 311 are arranged outwardly from the two rod parts 11. A gap 112 is formed between the two rod parts 11, and between the rod part 11 and the adjacent rod part 311.

In the fourth embodiment, a ratio of a number of the rod parts 11 to a number of the rod parts 311 may be 1:1 as described above, or other ratios than the ratio of 1:1. Specifically, only one rod part 11 or three or more rod parts 11 may be arranged inwardly from the two rod parts 311 arranged on the outer sides. Moreover, a number of the rod parts 311 may be greater than two; in this case, between the two rod parts 311 arranged on the outer sides, the rest of the rod parts 311 may be arranged together with the rod parts 11. Furthermore, the mounting part 310 may be configured only with the rod parts 311 containing non-metallic material.

The mounting part 310 is configured with the rod parts 311 containing the non-metallic material, in addition to the rod parts 11, and therefore, generation of induced current or eddy current in the mounting part 310 can be inhibited, compared with the mounting part 110 configured only with the rod parts 11 in the second embodiment. Specifically, it is possible to inhibit generation of the induced current, etc. by the electromagnetic field generated by the primary coil 2. Consequently, it is possible to inhibit decrease of an induced voltage that is generated in the secondary coil 3.

In the above-described embodiment, explanations have been given with respect to an example where the rod parts 11 and the rod parts 311 extend in the traveling direction; however, the rod parts 11 and the rod parts 311 may extend in the guiding direction.

Fifth Embodiment

Next, the fifth embodiment of the present invention will be described with reference to FIG. 6. Although a basic configuration of a coil mounting structure in the fifth embodiment is the same as that of the coil mounting structure in the fourth embodiment, the coil mounting structure in the fifth embodiment is different from that in the fourth embodiment with respect to an arrangement of some of the rod parts. Accordingly, in the fifth embodiment, some of the rod parts will be described with reference to FIG. 6, and explanations of the other constituent elements, etc. will not be repeated.

Figure 6:
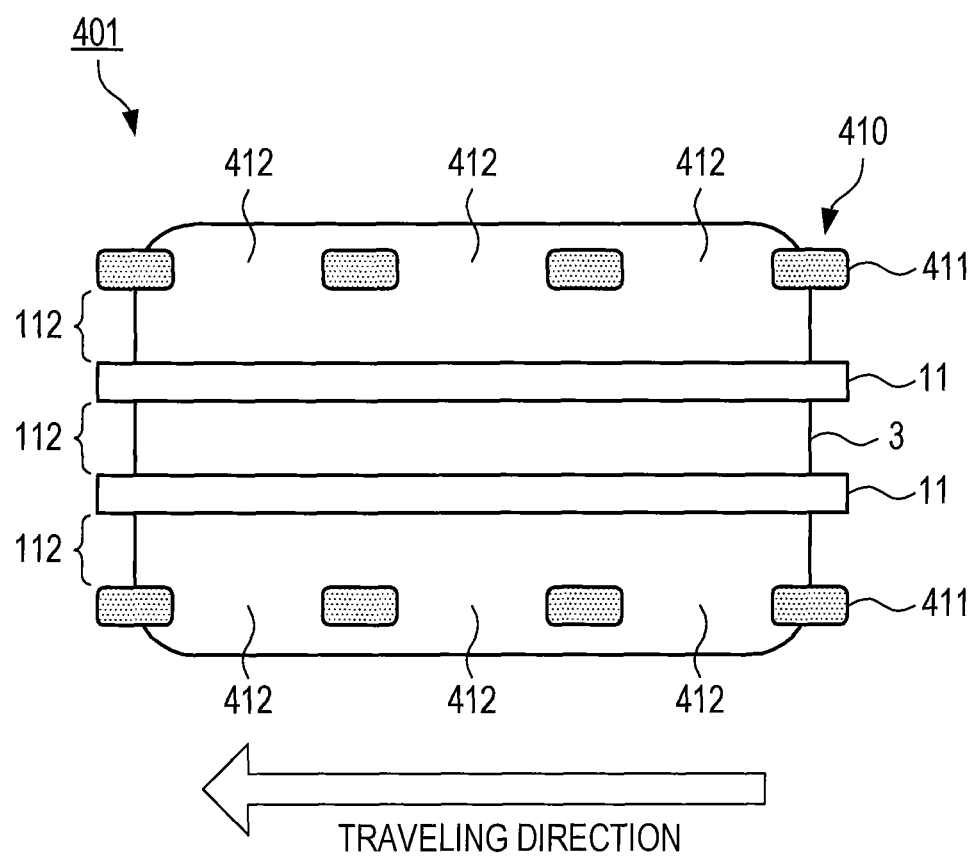
FIG. 6 is a diagram showing a coil mounting structure according to a fifth embodiment of the present invention.

As shown in FIG. 6, a mounting part 410 of a power feed device 401 in the fifth embodiment comprises two stick-shaped rod parts 11 and two stick-shaped rod parts 411. As in the rod parts 311 in the fourth embodiment, the rod parts 411 contain non-metallic material.

The rod parts 411 is different from the rod parts 311 in the fourth embodiment with respect to clearances 412. The clearances 412 are configured to separate the stick-shape of the rod parts 411. In the fifth embodiment, the single rod part 411 is separated into four segments by the three clearances 412.

A number of the clearances 412 should not be limited to three as in the above-described embodiment, and may be one or more. Moreover, the clearances 412 may be provided corresponding to the rod parts 411 and/or the rod parts 11. Furthermore, the clearances 412 may be provided corresponding to rod parts located on the outer sides in the arrangement of the rod parts 11 and the rod parts 411. Alternatively, the clearances 412 may be provided corresponding to rod parts located on the inner sides of the arrangement of the rod parts 11 and the rod parts 411.

Because of the clearances 412 provided in the rod parts 411, weight reduction of the mounting part 410 can be achieved, thereby achieving weight reduction of the power feed device 401 as a whole.

In the above-described embodiment, explanations have been given with respect to an example where the rod parts 411 contain the non-metallic material; however, the rod parts 411 may contain metallic material. If the rod parts 411 contain metallic material, in addition to the weight reduction of the mounting part 410, inhibition of generation of induced current and/or eddy current in the rod parts 411 can be achieved. Consequently, compared with a configuration comprising only the rod parts 11, in a configuration where the rod parts 411 are also provided, reduction of an induced voltage generated in the secondary coil 3 can be inhibited.

In the above-described embodiment, explanations have been given with respect to an example where the rod parts 11 and the rod parts 411 extend in the traveling direction; however, the rod parts 11 and the rod parts 411 may extend in the guiding direction.

Sixth Embodiment

Next, the sixth embodiment of the present invention will be described with reference to FIG. 7. Although a basic configuration of a coil mounting structure in the sixth embodiment is the same as that of the coil mounting structure in the first embodiment, the coil mounting structure in the sixth embodiment is different from that in the first embodiment in which a protection cover is provided in the sixth embodiment. Accordingly, in the sixth embodiment, the protection cover will be described with reference to FIG. 7, and explanations of the other constituent elements, etc. will not be repeated.

Figure 7:
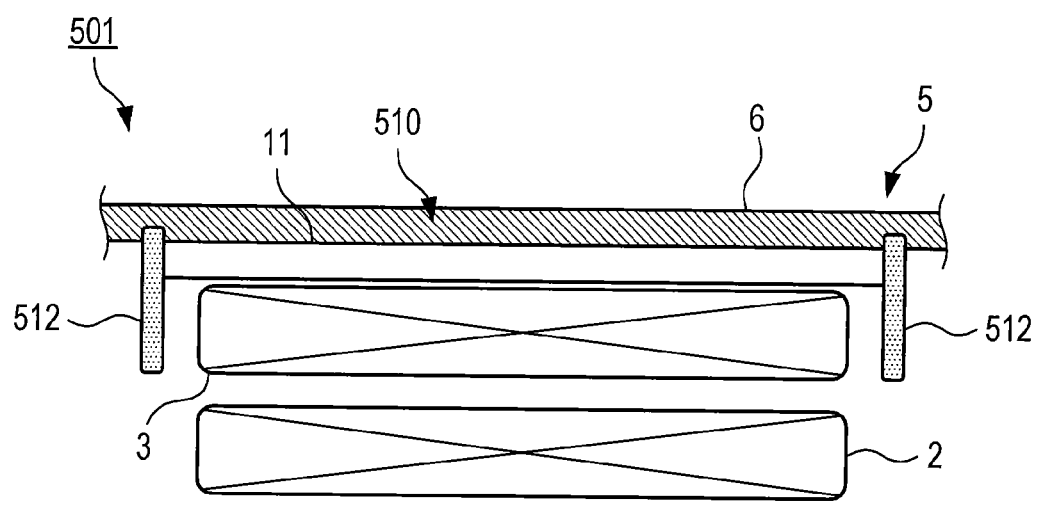
FIG. 7 is a diagram showing a coil mounting structure according to a sixth embodiment of the present invention.

As shown in FIG. 7, a mounting part 510 of a power feed device 501 in the sixth embodiment further comprises a protection cover 512. The protection cover 512 is a cylindrical member that surrounds circumferences of the secondary coil 3 and the rod parts 11. The protection cover 512 contains the secondary coil 3 and the rod parts 11 in the internal space thereof.

The protection cover 512 is formed by combining a plurality of plate-like members made of non-metallic material, so as to have the cylindrical shape. Examples of the non-metallic material are non-metallic material having a electrical conductivity lower than that of metal, more specifically, resin material such as fiber-reinforced resin, ceramic material, and so on.

The protection cover 512 formed by using the non-metallic material enables inhibition of generation of induced current and/or eddy current in the mounting part 510 disposed inside the protection cover 512. Specifically, it is possible to inhibit generation of the induced current, etc. in the mounting part 510, which is generated by the electromagnetic field produced by the primary coil 2. This enables inhibition of decrease in an induced voltage generated in the secondary coil 3.

The technical scope of the present invention should not be limited to the above-described embodiments, and various modifications can be made without departing from the scope of the present invention.

What is claimed is:

1. An object comprising:
   a housing for facing a primary coil;
   a secondary coil for receiving power from the primary coil; and
   a mounting part mounting the secondary coil to the housing,
   wherein the mounting part comprises:
      a first internal rod part shaped like a rod, oriented lengthwise in a traveling direction, and having a first length approximately equal to a length of the housing in the traveling direction,
      a second internal rod part shaped like the first internal rod part, oriented parallel to the first internal rod part, and having a second length approximately equal to the first length,
      a left series of left rod parts, oriented in series near a left side of the housing, each left rod part having a left rod length of less than half of the first length, and each left rod part separated from any adjacent left rod part by one left rod clearance,
      a right series of right rod parts, oriented in series near a right side of the housing, each right rod part having a right rod length of less than half of the first length, and each right rod part separated from any adjacent right rod part by one right rod clearance, and
   wherein the first internal rod part, the second internal rod part, the left series of left rod parts, and the right series of right rod parts are all parallel and co-planar.

* * * * *